United States Patent [19]

Ebner et al.

[11] Patent Number: 5,526,996
[45] Date of Patent: Jun. 18, 1996

[54] SEAT BELT RETRACTOR

[75] Inventors: Ralf Ebner, Gschwend; John Grout, Alfdorf; Volker Holzapfel, St. Wendel; Albrecht Müller, Durlangen; Günter Weyhmüller, Vordersteinenberg, all of Germany

[73] Assignee: TRW Repa GmbH, Aldorf, Germany

[21] Appl. No.: 237,828

[22] Filed: May 4, 1994

[30] Foreign Application Priority Data

May 5, 1993 [DE] Germany .................. 43 14 883.2

[51] Int. Cl.[6] .................... B60R 22/40; B60R 22/46
[52] U.S. Cl. ........................ 242/374; 242/379.1
[58] Field of Search ............... 242/374, 379.1, 242/383.4; 280/806, 807, 805; 297/470, 471, 472, 478

[56] References Cited

U.S. PATENT DOCUMENTS 3,942,819  3/1976  Schwanz et al. .
4,244,600  1/1981  Takada ..................... 242/383.4 X
4,423,846  1/1984  Fohl ......................... 242/374
5,344,095  9/1994  Frei ......................... 242/374

FOREIGN PATENT DOCUMENTS 3600004  7/1987  Germany .

Primary Examiner—John M. Jillions
Attorney, Agent, or Firm—Tarolli, Sundheim, Covell Tummino & Szabo

[57] ABSTRACT

The seat belt retractor has a belt reel (12) rotatably mounted in a frame (10). A vehicle-sensitive latching mechanism includes a control disk (64) connected to the belt reel (12), rotation of which is lockable by means of the vehicle-sensitive inertial sensor (71, 71a, 73a, 75a). A belt tensioning drive engages the first axial end of a torsion bar (30), the second end of which is drivingly coupled to the belt reel (12). After belt tensioning the first end of said torsion bar (30) is blocked on the frame (10). Under the load subsequently introduced via the belt webbing (14) the torsion bar (30) is twisted about its axis for conversion of energy. The control disk (64) is connected to the belt reel (12) via a torque-limiting coupling (60, 62, 68, 74, 78; 92 to 106).

12 Claims, 5 Drawing Sheets

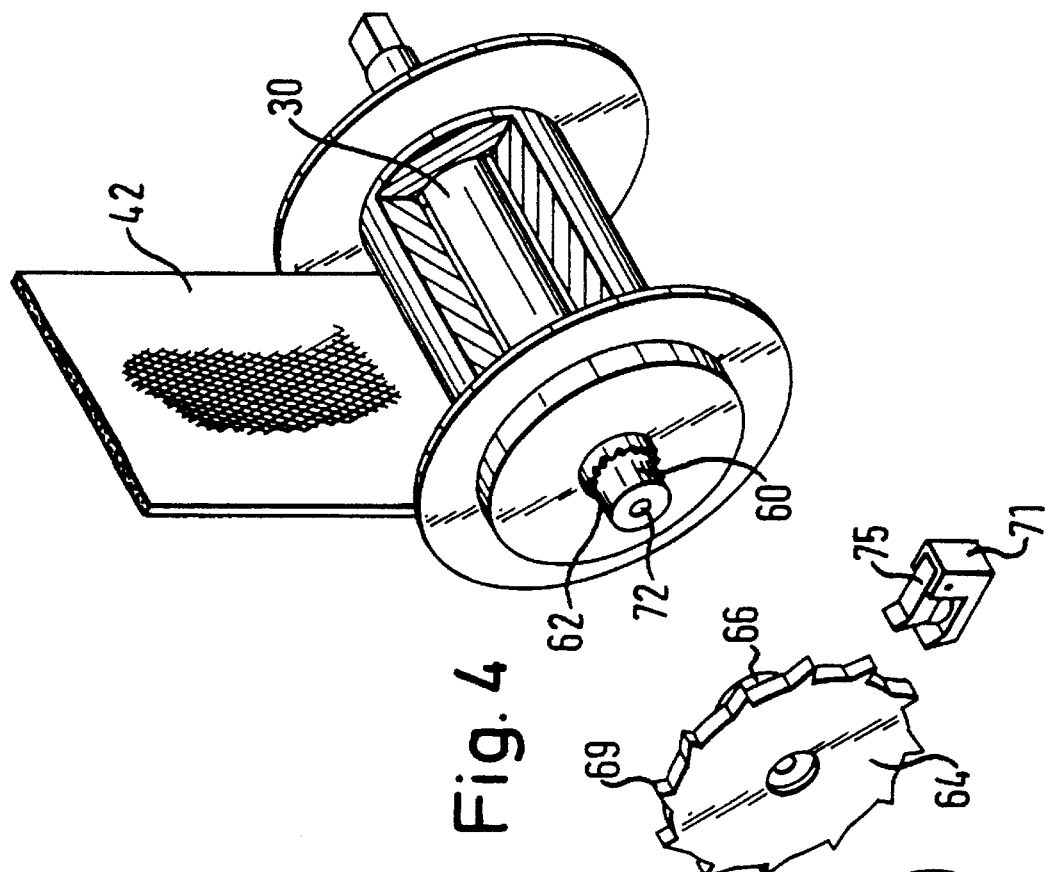
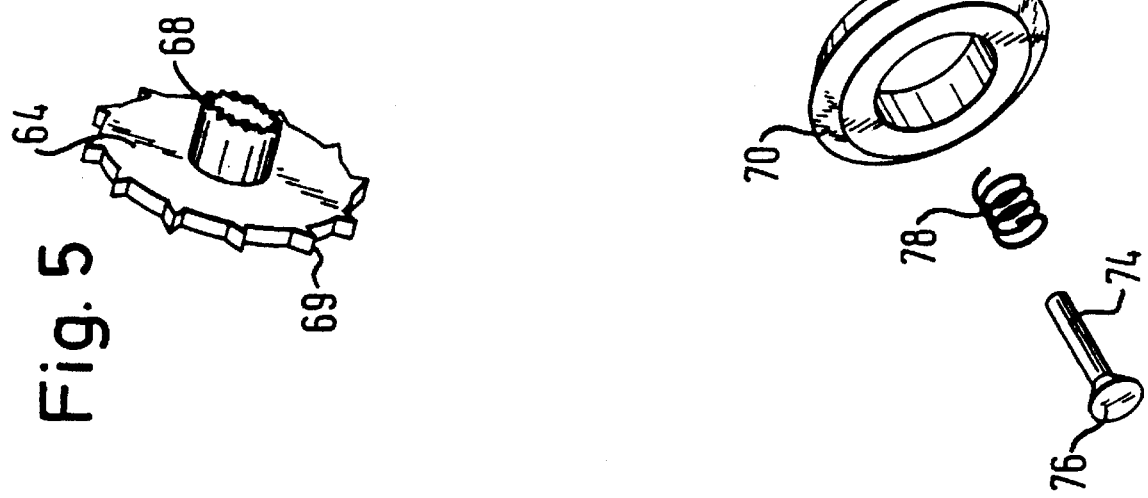

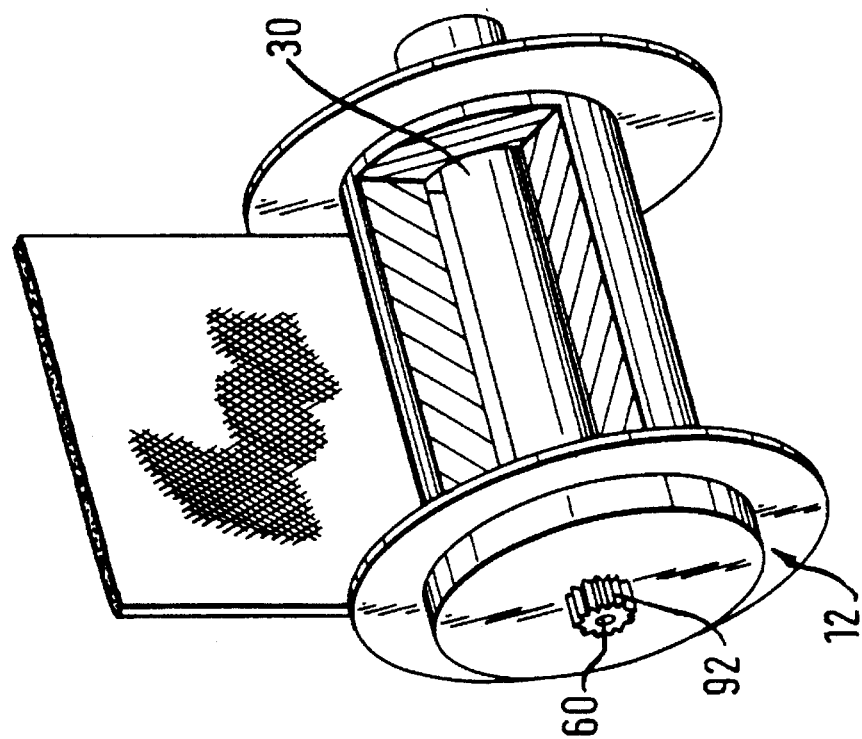
Fig. 7
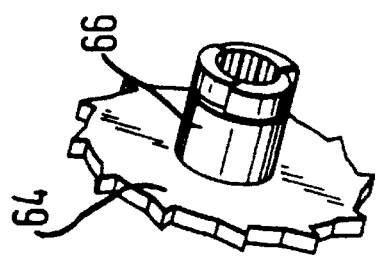
Fig. 9
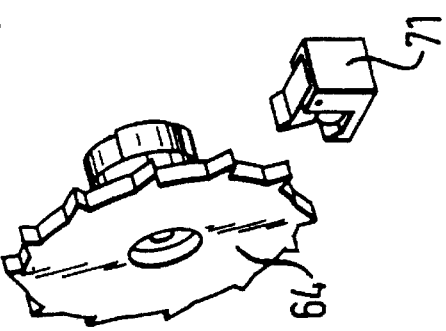
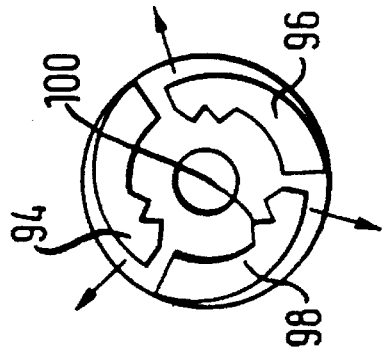
Fig. 8
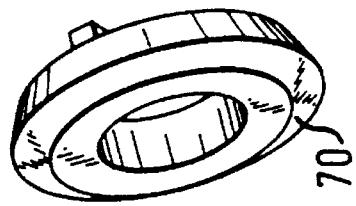

SEAT BELT RETRACTOR

The present invention relates to a seat belt retractor with a belt pretensioner drive engaging a belt reel rotatably mounted in a frame.

In a belt retractor of this kind known from U.S. Pat. Spec. No. 4,423,846 the belt reel is blocked after belt tensioning due to a coupling mechanism coupling the belt reel rigidly to the tensioning drive by clamping the clamp rollers, the tensioning drive in turn being blocked by a system of locking rollers when the tensioning stroke is completed. Attempts have already been made to enhance the protection afforded by seat belt systems equipped with belt tensioners by energy being converted following belt tensioning so as to deplete peak loads in the belt webbing. Converting energy in this way is, for example, possible by stretcher members incorporated in the positive interlock of the belt system which undergo plastic deformation when loaded.

By the invention a novel belt retractor with a belt pretensioner is provided in which energy conversion means are incorporated. According to the invention the seat belt retractor comprises a frame, a belt reel rotatably supported in the frame and a belt pretensioner drive for rotating the belt reel in a belt coiling direction. A torsion bar has a first axial end connected with the belt reel and a second axial end engaged by the belt pretensioner drive. Locking means are responsive to rotation of the belt reel in an uncoiling direction after operation of the belt pretensioner drive to lock the second axial torsion bar end against rotation with respect to the frame in the uncoiling direction.

Preferably, the seat belt retractor comprises a vehicle-sensitive blocking mechanism and disabling means for disabling the vehicle-sensitive blocking mechanism while the locking means is effective to lock the second axial torsion bar end. The vehicle-sensitive blocking mechanism comprises an inertial sensor and a control disk for cooperation with the sensor, and the control disk is coupled in rotation with the belt reel by means of a torque-limiting coupling.

In the retractor of the invention, and following a belt tensioning operation, the torsion bar permits the belt reel to be reversely rotated by an angle of rotation which is more than adequate for an intended energy conversion. Torsion bars of suitable grades of steel permit twisting by more than 360° between the two axial ends of the torsion bar. By means of the torque-restricting coupling the control disk is decoupled from the belt reel as of a specific load so that the control disk blocked by the vehicle-sensitive sensor is not ruined by the belt reel turning in the unwinding direction thus retaining proper functioning of the vehicle-sensitive locking mechanism.

According to another aspect of the invention, the belt pretensioner drive of the retractor comprises a pulley, a cable engaging a peripheral portion of the pulley, a coupling disk connected to the pulley for joint rotation, at least one coupling pawl deflectably mounted on the coupling disk and a drive wheel connected to the second axial torsion bar end and having a coupling toothing for selective engagement by the coupling pawl. After completion of a belt pretensioning operation and, eventually, of an energy conversion by twisting of the torsion bar, the coupling pawl may disengage the drive wheel so that the belt reel is free to rotate in the frame and the vehicle-sensitive blocking functions are fully restored.

Further features and advantages of the invention will now be evident from the description of several embodiments of the invention and from the drawing to which reference is made and in which:

FIG. 1 is a perspective exploded view of a first embodiment of the belt retractor and belt tensioner without the function parts for actuating the locking mechanism;

FIG. 2 an axial section of the belt retractor shown in FIG. 1;

FIG. 3 a section along the line III—III in FIG. 2;

FIG. 4 is a greatly simplified exploded view of the belt retractor of the invention showing the function parts for actuating the locking mechanism;

FIG. 5 a perspective view of a control disk;

FIG. 6 a perspective view of a second alternative of a belt retractor showing the function parts for input control of the locking mechanism showed in the partial exploded view;

FIG. 7 is a greatly simplified exploded view of a third embodiment of a belt retractor showing the function parts for actuating the locking mechanism of the invention;

FIG. 8 is a greatly simplified front view of the control disk of the embodiment of the invention shown in FIG. 7; and FIG. 9 is a greatly simplified perspective view of the control disk of the embodiment of the invention shown in FIG. 7.

In the embodiment of a belt retractor and belt tensioner shown in FIGS. 1 to 5 a belt reel 12 is rotatably mounted between the arms of a load-bearing frame 10. The belt reel 12 is used to reel the belt webbing 14.

Figure 1:
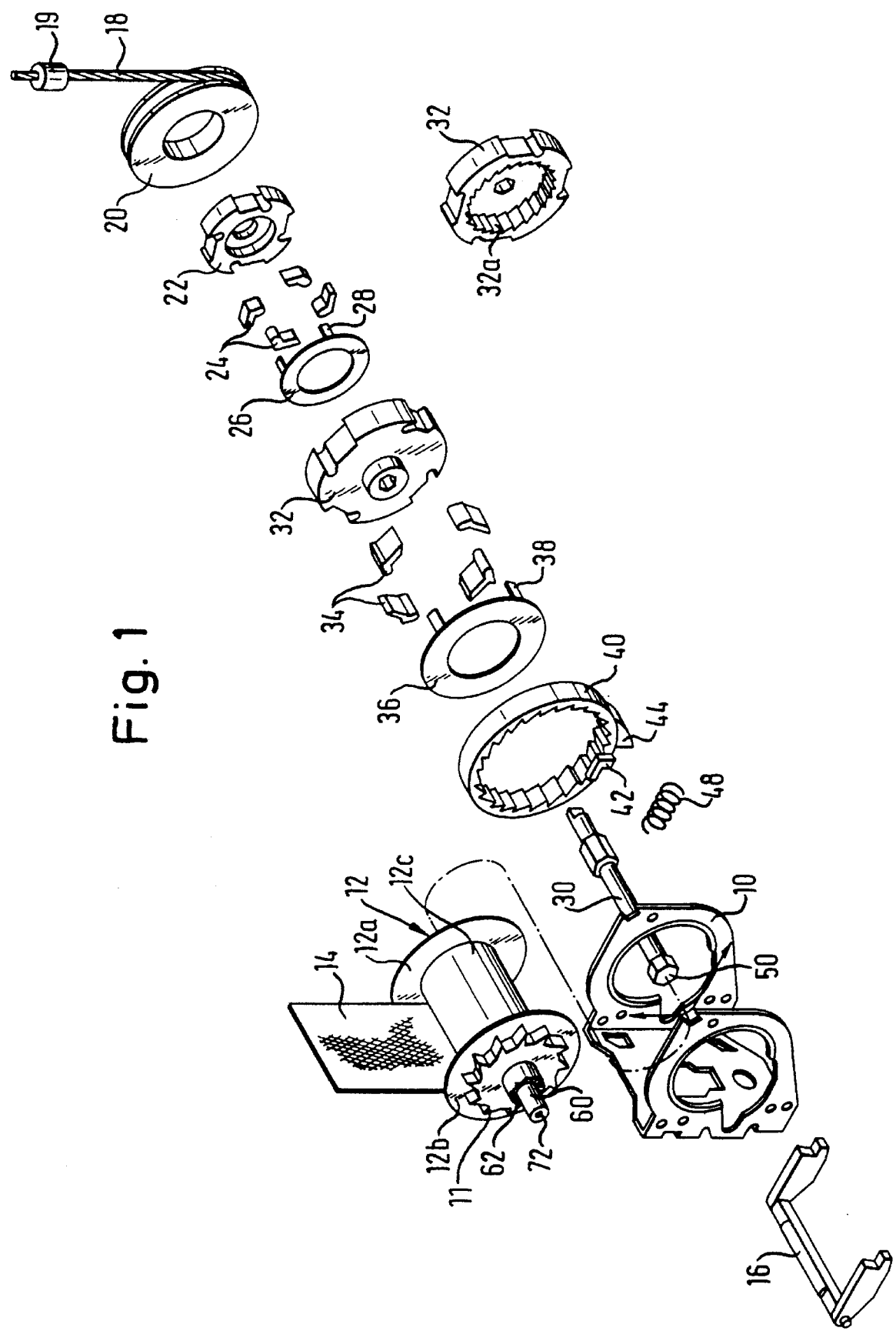
Figure 2:
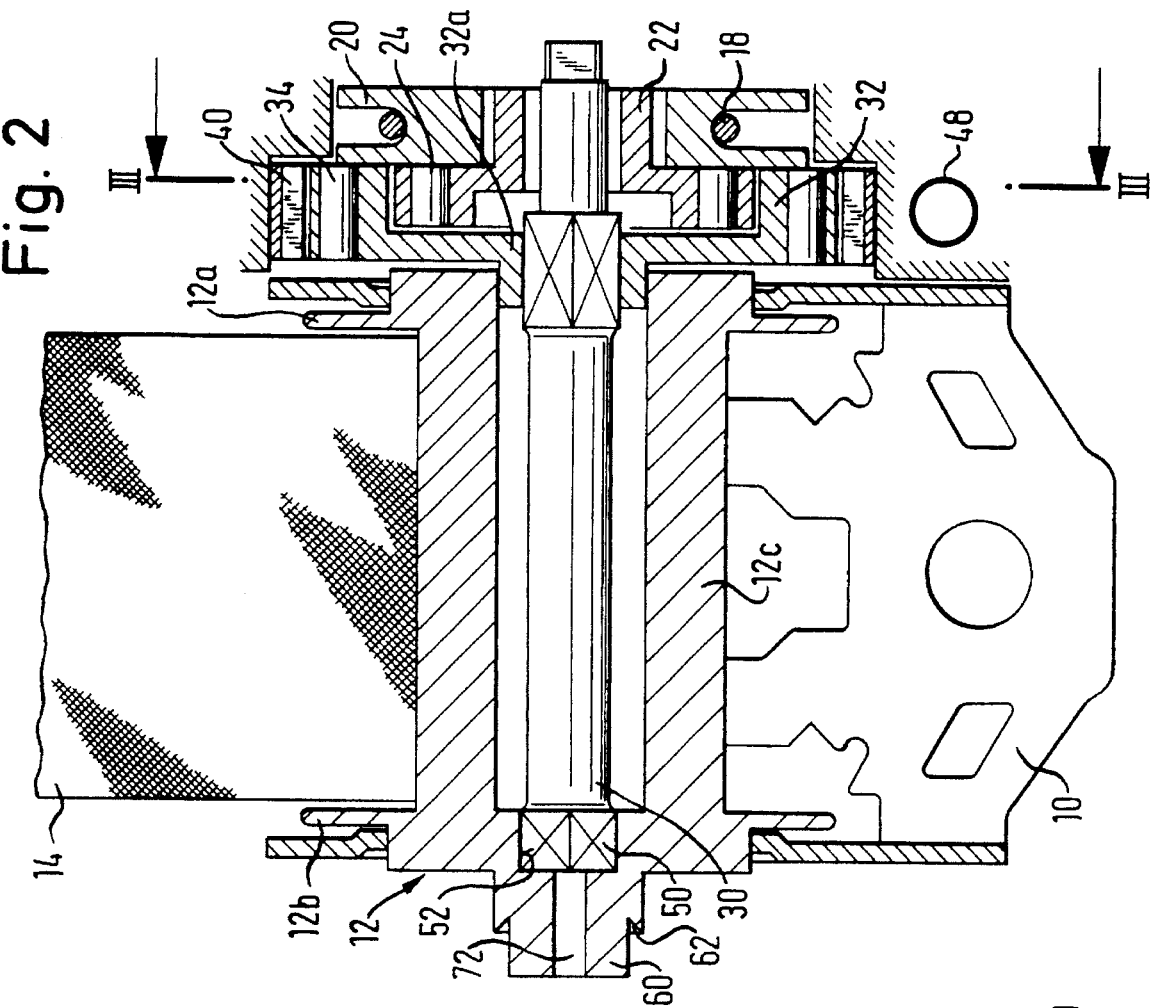
Figure 3:
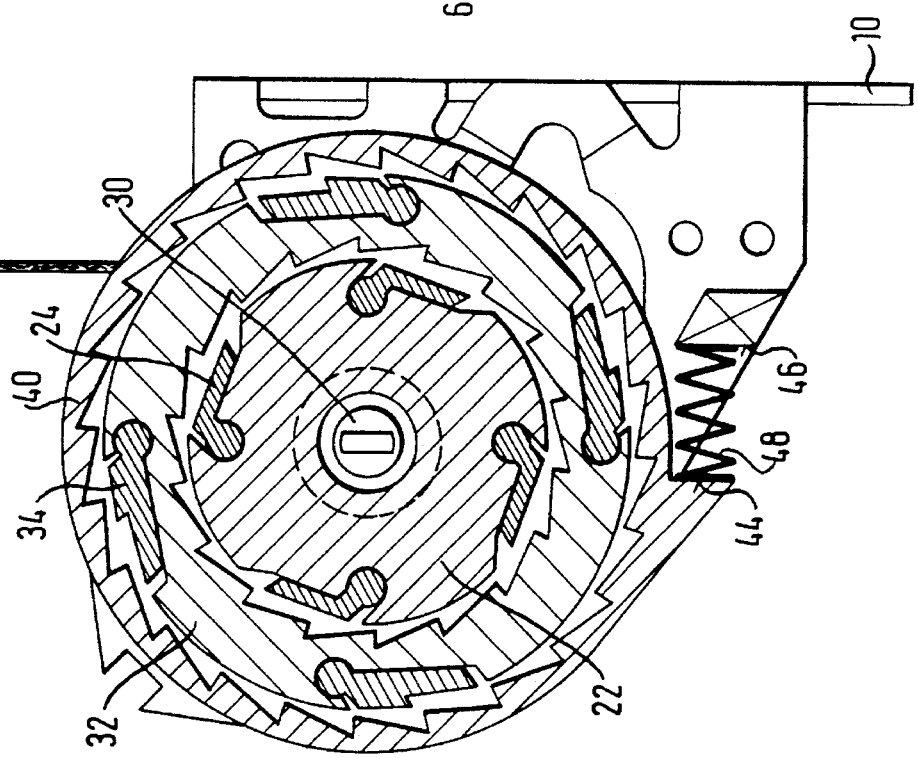

On the left-hand side of the frame 10 as shown in FIG. 1 an actuator mechanism for blocking the belt reel is provided and on the right-hand side of the frame 10 a retractor spring (not shown) engages the end of the belt reel 12 to load the belt reel 12 in the direction of belt retraction. A blocking pawl 16 blocks rotation of the belt reel 12 in the belt unreeling direction by engagement into a blocking toothing 11 on the belt reel 12, under a vehicle and/or belt-sensitive control system to be explained in more detail.

On the right-hand side of the frame 10 the functional parts are also provided as necessary for the belt tensioning function and a subsequent energy transformation function.

This involves a cable 18 on which a tensile force is exerted on release of the belt tensioning drive, for example, by a pyrotechnic piston/cylinder linear drive, an inertial mass, a preloaded spring and the like. The cable 18 engages the circumference of a pulley 20 about which it is wrapped by at least one turn. The pulley 20 is arranged on a first cylindrical boss of a first ratchet wheel 22 to which it is drivingly coupled.

The ratchet wheel 22 includes four swivable pawls 24 spaced around its circumference. The pawls 24 are offset pairwise by half a tooth pitch with respect to a 90° pitch to ensure reliable engagement of the coupling. Leaf springs 28 provided on a disk 26 load the pawls relative to the ratchet wheel 22 radially inwards so that they can be swivelled out only when the spring force is overcome. The disk 26 is arranged concentrically on the ratchet wheel 22.

This first ratchet wheel 22 is rotatably mounted at the end of a torsion bar 30 facing the belt tensioner, the torsion bar being arranged coaxially within the belt reel 12.

A second ratchet wheel 32 is formed integral with a cylindrical drive wheel 32a clasping the first ratchet wheel 22 by an inner coupling toothing assigned to the first ratchet wheel 22 and with which it is coaxially located about the torsion bar 30 as well as being in positive interlock with the torsion bar 30.

The pawls 24 are swivel-mounted on the circumference of the first ratchet wheel 22 so that they swivel out at a specific angular acceleration of the first ratchet wheel 22 and thus of the pulley 20 directly connected thereto, engage the inner coupling toothing of the second ratchet wheel 32 and thus couple the pulley 20 via the ratchet wheels 22 and 32 and the torsion bar 30 to the belt reel 12.

The second ratchet wheel 32 is provided circumferentially with four pawls 32 which are loaded radially inwards by leaf springs 38. These pawls 34 are offset in the same way as the pawls 24. The leaf springs 38 are provided on a disk arranged concentrically with the ratchet wheel 32.

Surrounding the second ratchet wheel 32 a ring 40 including an inner coupling toothing is provided. The ring 40 is mounted in a bearing means 10a connected to the frame 10. The inner coupling toothing and the pawls 34 are formed in such a way that at a specific angular acceleration of the torsion bar 30 and thus of the second ratchet wheel 32 in the tensioning direction of the belt webbing the pawls engage the inner coupling toothing of the ring 40 due to the loading of the leaf springs 38.

On its side facing the frame 10 the ring 40 is provided with a control cam 42 which on rotation of the ring 40 engages the blocking pawl 16 in the tensioning direction of the belt web, moving this pawl downwards into an inactive position, thereby disabling the locking mechanism.

On its circumferential surface the ring 40 is provided with a stop part 44. On its side facing the belt tensioner the frame 10 is provided with a stop 46 assigned to the stop part 44. Between the stop part 44 and the stop 46 a pressure spring 48 is provided by means of which the ring 40 is preloaded away from the stop 46. When coupling the second ratchet wheel 32 in the ring 40 the latter is turned against the force of the pressure spring 48 until the stop part 44 comes up against the stop 46, blocking any further turning of the ring 40. At its axial end facing away from the belt tensioner the torsion bar 30 is provided with a knurled header 50 which is inserted in a suitably configured recess 52 of the belt reel 12 for positive interlock. The belt reel 12 mainly comprises two side flanges 12a, 12b and a substantially hollow cylindrical sleeve 12c having a slot (not shown) for the through-passage of the belt webbing 14 to be wound on the belt reel 12. The torsion bar 30 extends through the hollow cylindrical interior of the sleeve 12c of the belt reel. The end of belt webbing 14 forms a loop which is placed on the torsion bar 30. The torsion bar 30 is rotationally connected to the belt reel 12 by the knurled header. In the idle condition the pawls 24 and 34 of the ratchet wheels 22 and 32 are out of engagement with the inner coupling toothings assigned respectively so that the belt reel 12 is free to rotate with the torsion bar 30.

On its side remote from the belt tensioning drive the belt reel 12 is provided with a projection 60 with a spur toothing 62. On the projection 60, serving as a shaft, of the belt reel 12 a control disk 64 is mounted on a hub 66, it engaging by an end-sided toothing 68 located at the end facing the belt reel 12 and the projection 60 respectively mates with the end-sided toothing 62 of the projection 60. The control disk 64 is shiftable axially relative to the projection 60 so that the end-sided toothings 62 and 68 assigned to each other can be unmated, the control disk 64 then being free to rotate relative to the belt reel 12. This is illustrated in FIG. 1 greatly simplified for the sake of a better overview.

On its outer circumference the control disk 64 is provided with a control toothing 69 for the vehicle-sensitive trigger mechanism. Rotatably mounted on this control disk 64 is an inertial disk 70, the rotation of which is restricted to a predetermined angular range. The control toothing 69 of the control disk 64 interacts with a vehicle-sensitive trigger mechanism in a known manner, this mechanism being identified by the reference numeral 71 and comprising a trigger pawl 75 swivably mounted by resting on a ball weight on the housing 10. In a known manner and by means of the control disk the blocking pawl 16 (FIG. 1) is activatable in interaction with the blocking toothing 11 on the flange 12a, 12b of the belt reel 12.

In an axial recess 72 of the projection 60 a pin 74 is pressed into place. This pin 74 is provided with a widened end 76, serving as the abutment surface for a spring 78. The spring 78 is in contact with the end surface 66 of the control disk 64 and tensions the control disk 64 in the axial direction against the end-sided toothing 62 of the projection 60. Due to the end-sided toothings 62 and 68 as well as due to the pin 74 and the spring 78 a torque-limiting coupling is formed between the control disk 64 and the belt reel 12.

When the belt tensioner is activated a torque is exerted on the circumference of the pulley 20 by the cable 22 in a manner as known. Due to the resulting rotation of the pulley 20 the pawls 24 of the ratchet wheel 22 are moved into mating with the inner coupling toothing of the ratchet wheel 32 so that the pulley 20, the ratchet wheel 22, the ratchet wheel 32 and the torsion bar 30 are coupled firmly together. Due to the torsion bar 30 rotation of the pulley 20 is transmitted to the belt reel 12. The latter is driven in the direction of retraction so that belt slack is eliminated from the seat belt system. On completion of belt tensioning the two ratchet wheels 22 and 32 remain coupled together so that the torsion bar 30 remains connected to the pulley 20.

On completion of belt tensioning forward shift of the vehicle occupant occurs so that the belt web 14 is withdrawn from the belt reel 12. The belt reel 12, the torsion bar 30 and the second ratchet wheel 32 now turn together with the first ratchet wheel 22 in the direction of belt withdrawal.

When the angular acceleration is sufficiently high the pawls 34 of the second ratchet wheel 32 overcome the loading of the leaf springs 38 to swivel out and engage the inner coupling toothing of the ring 40. This results in the ring 40 overcoming the force of the pressure spring 48 to turn until the stop part 44 of the ring 40 comes up against the stop 46 of the frame 10 to prevent any further turning of the ring 40, whereby the control cam 42 engages the blocking pawl 16, moving it downwards into an inactive position. At the same time the belt reel 12 is blocked in the belt withdrawal direction by the torsion bar 30, the second ratchet wheel 32, the ring 40 and the support of the stop part 44 on the stop 46.

Should a high load occur in the seat belt system after the belt has been tensioned, however, and a correspondingly high torque exerted via the belt webbing 14 on the belt reel 12 at a tensile stress of several kN the resulting torsion now causes commencement of plastic deformation of the torsion bar 30 about its axis. As a result of this plastic deformation energy is used up and the peak loads occuring in the belt webbing 14 are largely absorbed. By suitably dimensioning and selecting the material both the threshold as of which the plastic deformation of the torsion bar 30 commences and its further behaviour along with the resulting damping effect can be set to practically any degree.

Since the blocking pawl 16 continues to be held out of engagement with the belt reel 12 the latter is free to rotate.

When the load on the belt webbing 14 is subsequently relieved the pawls 24 and 34 disengage from the corresponding coupling toothing due to the spring force exerted by the leaf springs 28 and 38. In addition the ring 40 is turned back to its starting position by the spring 38, thus restoring the retraction function as well as the vehicle-sensitive blocking feature.

Even before the belt tensioner is activated the trigger pawl 75 engages the control toothing 69 of the control disk 64. However, the control toothing 69 is configured so that rotation of the control disk 64 together with the belt reel 12 is possible in the direction of belt retraction. In subsequent rotation in the direction of retraction the control disk 64 is unable to follow rotation of the belt reel 12. Due to the torque-limiting coupling between the control disk 64 and the belt reel 12 the control disk 64 is uncoupled from the belt reel 12 or the projection 60. As soon as a specific torque value determined by the spring 78 and the geometry of the toothings 62, 68 between the belt reel 12 and the control disk 64 is exceeded an axial displacement of the control disk 64 occurs until the toothings 62 and 68 are disengaged from each other. In this way the vehicle-sensitive trigger mechanism remains functionable even when the belt has been tensioned and a conversion of energy has taken place.

FIG. 5 illustrates the control disk 64 is a different perspective view in which the toothing 68 is clearly discernible, assigned to the toothing 62 of the projection 60.

Figure 6:
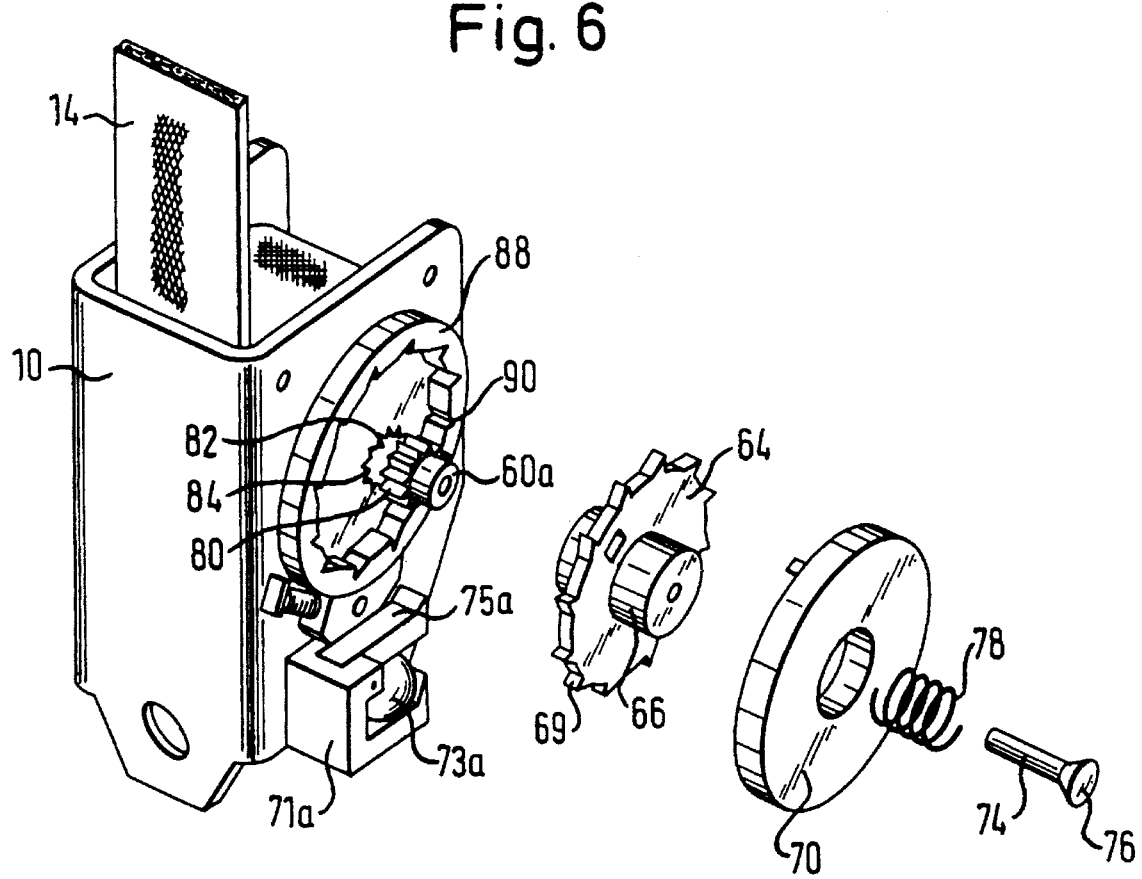

In FIG. 6 a further embodiment of the invention is illustrated. Instead of the projection 60 a pivot pin 60a having an external toothing 80 is provided separate from the belt reel 12. The pivot pin 60a with the external toothing 80 is inserted in a recess 82 in the belt reel 12 having a corresponding inner toothing 84 to thus rotate together with the belt reel 12. As in the embodiment previously described the control disk 64 is mounted on the pivot pin 60a.

In FIG. 6 part of the belt and vehicle sensitive locking mechanism is to be seen. A control ring 88 is rotatably mounted on the outside of the frame 10. The control ring 88 is provided with an inner toothing 90 and rotatably mounted by known means to activate the locking pawl 16. The inner toothing 90 interacts with a control pawl (not shown) on the control disk 64 to couple the latter to the control ring 88 with rotation of the inertial disk 70 relative to the control disk 64, thus actuating locking of the belt reel 12. In this embodiment the inertial disk 70 is mounted on the hub 66 of the control disk 64. The vehicle-sensitive sensor 71a comprises the trigger pawl 75a located on an inertial ball 73a and functions on the same principle as the sensor 71.

In the FIGS. 7 to 9 yet a further embodiment of the torque-limiting coupling between the belt reel 12 and the control disk 64 is shown. The projection 60 differs from that of the previous embodiments by it being provided with an outer toothing 92, in accordance with which the toothing on the control disk 64 is also configured. Three swivable pawls 94, 96 and 98 are provided with a toothing 100 on their inside surface suitably assigned to the outer toothing 92 of the projection 60. The pawls 94, 96 and 98 are formed pliant and pretensioned inwards to engage the outer toothing 92 of the projection 60. Should the force acting radially outwardly exceed the spring force of the pawls 94 to 98, however, then the pawls 94 to 98 are shifted substantially in a radial direction with reference to the control disk 64 outwardly and thus disengage the control disk 64 from the belt reel 12.

By means of the torque-limiting coupling yet a further effect is achieved. When the belt tensioner connected to the belt reel 12 is actuated the belt reel 12 is strongly accelerated contrary to the direction of belt retraction. Nowadays higher powered gas generators are being used which permit a more effective elimination of belt slack. The coupling of the inertial disk 70 which actuates the belt-sensitive locking mechanism is designed for angular acceleration values of approx. 0.5 g to 2 g. During belt tensioning, however, much higher angular accelerations result, i.e. with a risk of the trigger means of the locking mechanism being damaged, particularly when high-power gas generators are employed. Due to the coupling limiting the torque in both directions of rotation the control disk 64 is uncoupled from the belt reel 12 by simple means even at commencement of belt tensioning so that continuing proper functioning of the trigger means is assured under all circumstances.

What is claimed is:

1. A seat belt retractor comprising a frame, a belt reel rotatably supported in said frame, a belt pretensioner drive for rotating said belt reel in a belt coiling direction, a torsion bar having a first axial end connected with said belt reel and a second axial end engaged by said belt pretensioner drive, locking means responsive to rotation of said belt reel in an uncoiling direction after operation of said belt pretensioner drive to lock said second axial torsion bar end against rotation with respect to said frame in said uncoiling direction, a vehicle-sensitive blocking mechanism, and disabling means for disabling said vehicle-sensitive blocking mechanism while said locking means is effective to lock said second axial torsion bar end, said vehicle-sensitive blocking mechanism comprising an inertial sensor and a control disk for cooperation with said sensor, said control disk being coupled in rotation with said belt reel by means of a torque-limiting coupling, said torque-limiting coupling comprising resiliently interengaged toothings on said control disk and said belt reel.

2. The seat belt retractor of claim 1 wherein said control disk is axially movable with respect to said belt reel.

3. A seat belt retractor comprising a frame, a belt reel rotatably supported in said frame, a belt pretensioner drive for rotating said belt reel in a belt uncoiling direction, a torsion bar having a first axial end connected with said belt reel and a second axial end engaged by said belt pretensioner drive, locking means responsive to rotation of said belt reel in an uncoiling direction after operation of said belt pretensioner drive to lock said second axial torsion bar end against rotation with respect to said frame in said uncoiling direction, a vehicle-sensitive blocking mechanism, and disabling means for disabling said vehicle-sensitive blocking mechanism while said locking means is effective to lock said second axial torsion bar end, said vehicle-sensitive blocking mechanism comprising an inertial sensor and a control disk for cooperation with said sensor, said control disk being coupled in rotation with said belt reel by means of a torque-limiting coupling, said torque-limiting coupling comprising at least one coupling pawl on one and a toothing on the other one of said belt reel and said control disk, said coupling pawl being resiliently held engaged with said toothing.

4. A seat belt retractor comprising a frame, a belt reel rotatably supported in said frame, a belt pretensioner drive for rotating said belt reel in a belt coiling direction, a torsion bar having a first axial end connected with said belt reel and a second axial end engaged by said belt pretensioner drive, and locking means responsive to rotation of said belt reel in an uncoiling direction after operation of said belt pretensioner drive to lock said second axial torsion bar end against rotation with respect to said frame in said uncoiling direction, said belt pretensioner drive comprising a pulley, a cable engaging a peripheral portion of said pulley, a coupling disk connected to said pulley for joint rotation, at least one coupling pawl deflectably mounted on said coupling disk and a drive wheel connected to said second axial torsion bar end and having a coupling toothing for selective engagement by said coupling pawl, said drive wheel carrying at least one locking pawl and said locking means comprising a ring member mounted on said frame for limited rotation and provided with a locking toothing for selective engagement by said locking pawl.

5. The seat belt retractor of claim 4 which comprises a vehicle-sensitive blocking mechanism and disabling means for disabling said vehicle-sensitive blocking mechanism while said locking means is effective to lock said second axial torsion bar end.

6. The seat belt retractor of claim 5 wherein said vehicle-sensitive blocking mechanism comprises a blocking pawl for engagement with said belt reel and said disabling means comprises a holding member for holding said blocking pawl in a position out of engagement with said belt reel.

7. The seat belt retractor of claim 5 wherein said vehicle-sensitive blocking mechanism comprises an inertial sensor and a control disk for cooperation with said sensor, said control disk being coupled in rotation with said belt reel by means of a torque-limiting coupling.

8. The seat belt retractor of claim 7 wherein said torque-limiting coupling comprises resiliently interengaged toothings on said control disk and said belt reel.

9. The seat belt retractor of claim 8 wherein said control disk is axially movable with respect to said belt reel.

10. The seat belt retractor of claim 7 wherein said torque-limiting coupling comprises at least one coupling pawl on one and a toothing on the other one of said belt reel and said control disk, said coupling pawl being resiliently held engaged with said toothing.

11. The seat belt retractor of claim 4 which comprises a vehicle-sensitive blocking mechanism with a blocking pawl for selective engagement with a blocking toothing on said belt reel and said ring member is provided with a holding member for holding said blocking pawl in a position out of engagement with said blocking toothing.

12. The seat belt retractor of claim 4, wherein said belt reel is hollow and said torsion bar is coaxially accommodated in said belt reel.

* * * * *